United States Patent Office 3,478,112
Patented Nov. 11, 1969

3,478,112
PRODUCTION OF ALCOHOLS BY CATALYTIC HYDROGENATION OF CARBOXYLIC ACIDS
Karl Adam, Erich Haarer, and Konrad Dorfner, Ludwigshafen (Rhine), Germany, assignors to Badische Anilin- & Soda-Fabrik Aktiengesellschaft, Ludwigshafen (Rhine), Germany
No Drawing. Filed Mar. 12, 1965, Ser. No. 439,439
Claims priority, application Germany, Mar. 17, 1964, B 75,933
Int. Cl. C07b 1/00; C07c 29/00
U.S. Cl. 260—617
1 Claim

ABSTRACT OF THE DISCLOSURE

Production of alcohols by hydrogenation of carboxylic acids in the presence of cobalt-copper, manganese and/or chromium catalysts optionally containing inorganic acids and/or salts thereof.

---

This invention relates to the catalytic hydrogenation of carboxylic acids into alcohols and in particular it relates to the use in this process of catalysts which contain not only cobalt but also copper, manganese and/or chromium and if desired acids capable of forming polyacids, or salts thereof.

It is known that carboxylic acids may be converted into alcohols by catalytic hydrogenation. Catalytic reduction of free carboxylic acids to alcohols has however not yet been carried out satisfactorily and economically on an industrial scale. The catalysts, especially base metals and/or their oxides, are attached so strongly by carboxylic acids that they lose their initial activity after a few days and soon become completely inactive. Another disadvantage of the prior art catalysts is that practically complete conversion is only possible at a relatively low throughput.

We have now found that carboxylic acids can be advantageously catalytically hydrogenated to alcohols at elevated temperature by using a cobalt catalyst which contains copper, maganese and/or chromium.

Particularly good results are obtained with catalysts which also contain an inorganic acid or a salt of such an acid. Preferred additives of this type are inorganic acids capable of forming polyacids, and their alkali metal, alkaline earth metal and earth metal salts.

The catalysts used in the process according to this invention are distinguished by high activity and long life. Moreover they permit high throughputs with practically complete conversion.

Examples of suitable initial materials for the new process are aliphatic carboxylic acids having 2 to 20 carbon atoms and 1 to 3 carboxyl groups, aromatic carboxylic acids containing 1 to 3 aromatic nuclei and 1 to 3 carboxyl groups, araliphatic carboxylic acids with 8 to 15 carbon atoms and 1 or 2 caroboxyl groups, and cycloaliphatic acids having 7 to 15 carbon atoms and 1 to 3 carboxyl groups. Apart from the carboxyl groups, the initial materials may have hydrocarbon structure or may additionally bear inert substituents, such as 1 or 2 hydroxy groups or amino groups. When groups capable of being hydrogenated under the reaction conditions are present in the initial materials, for example 1 to 3 olefinic double bonds, nitro groups or carbonyl groups, these are converted. Examples of suitable initial materials are: acetic acid, propionic acid, butyric acid, stearic acid, oleic acid succinic acid, adipic acid, dodecane diacid-(1,12), benzoic acid, terephthalic acid, isophthalic acid, naphthalene-(1,-8)-dicarboxylic acid, phenylacetic acid, cyclohexane carboxylic acid, hexahydroterephthalic acid, $\epsilon$-hydroxycaproic acid, p-nitrobenzoic acid, salicyclic acid, m-amonobenzoic acid, $\beta$-aminopropionic acid and pyruvic acid. Obviouly it is also possible to hydrogenate mixtures of carboxylic acids. An example of this type is the technical mixture of monocarboxylic and dicarboxylic acids obtained as a byproduct in the catalytic oxidation of cyclohexane with air.

Those catalysts are preferred in which the weight ratio of cobalt to copper, manganese and/or chromium is from 1.5:1 to 300:1 (the said components being assumed to be present in the metallic condition). When the catalysts contain only one of the said other components apart from cobalt, copper is advantageously present in a larger amount than manganese or chromium. The ratio by weight of cobalt to copper is preferably from 1.5:1 to 50:1, whereas the ratio by weight of cobalt to manganese or chromium is advantageously from 0:1 to 300:1. Catalysts which contain cobalt, copper and manganese, the ratio by weight of the cobalt to the other two components being 1.5:1 to 50:1, are particularly suitable. In these catalysts, the copper should advantageously be present in at least the same amount by weight as the managanese. Catalysts in which the ratio by weight of copper to manganese is from 2:1 to 8:1 have proved to be particularly suitable.

Examples of suitable additives are sulfuric acid, boric acid, phosphoric acid, molybdic acid, vanadic acid and tungstic acid, and also salts of these acids with metals of groups I–A, II–A and III–A of the Periodic system of Elements. Examples of specific compounds, are: trisodium phosphate, sodium tetraborate, potassium dihydrogen phosphate, calcium hydrogen phosphate, magnesium hydrogen phosphate, aluminum phosphate, sodium molybdate, ammonium vanadate and sodium tungstate. Particularly good results are often achieved with catalysts which contain an inorganic acid and a salt of the same acid, for example phosphoric acid and a phosphate. The amount of inorganic acid and/or salt is in general 0.1 to 15% by weight with reference to cobalt.

The catalysts may be applied to inert carriers, such as silicic acid, bauxite, fuller's earth or aluminum oxide. Supported catalysts may be prepared for example by impregnating the carrier substance with solutions of salts of the metals in question, advantageously the nitrates, and if desired with a solution of the inorganic acid or a salt thereof, drying the impregnated carrier and decomposing the metal salts thermally into their oxides. It is also possible to precipitate the active components of the catalyst in the form of hydroxides or carbonates on the carrier and then to convert them into the oxides. The supported catalysts are advantageously treated with hydrogen at 180° to 400° C. prior to use, the oxides thus being converted at least partly into the metals.

Unsupported catalysts are particularly active. For example aqueous solutions of cobalt salts and of salts of the said other metals may be precipitated as hydroxides or carbonates. The said inorganic acids or salts thereof may be present during the precipitation. It is also possible, however, to add the inorganic acids or their salts to the mixture of hydroxides and/or carbonates. In any case, the precipitate is advantageously molded into shaped articles which are heated to temperatures which are advantageously from 250° to 900° C., particularly from 400° to 600° C., and converted into the oxides. The unsupported catalysts are also in general converted at least partly into metallic form by treatment with hydrogen at 180° to 400° C. prior to use.

The said inorganic acids or their salts cannot be dissolved out with water, even at high temperatures, from the catalysts which have been prepared in the manner described.

The new process is preferably carried out at temperatures of from 120° to 300° C. At from 140° to 220° C., the rate of reaction is so high that there is practically no chemical attack on the catalysts by the carboxylic acids.

Hydrogenation is advantageously carried out at superatmospheric hydrogen pressure. Pressures of 50 to 700 atmospheres are used in general.

It has proved to be particularly advantageous to carry out the hydrogenation in the presence of water. A water content of 0.5 to 70% by weight, with reference to carboxylic acid, is preferably set up. A preferred range is from 3 to 40%.

Another advantageous expedient is dilution of the initial material with the alcohol which is to be formed therefrom. If the reaction product is recycled, advantageously in the ratio by weight of initial material to recycled reaction product of 1:0.5 to 1:10, there is achieved not only a uniform temperature distribution and consequently a uniformly rapid hydrogenation, but also an increase in the rate of reaction and consequently a further lessening of chemical attack on the catalyst. Hitherto recycling reaction product as such has been avoided because it is known that esters form from carboxylic acids and alcohols under the reaction conditions. It is noteworthy that this undesirable competing reaction does not take place; on the contrary, small amounts of esters which may be contained in the initial materials are also hydrogenated into alcohols.

The process according to this invention may be carried out batchwise by introducing the initial materials and catalysts into an autoclave and heating them to the reaction temperature under a hydrogen atmosphere. In carrying out the process continuously, it is advantageous to pass the initial material and hydrogen over a stationary catalyst heated to the reaction temperature. The reaction products are in all cases advantageously recovered by distillation.

The alcohols obtained according to the new process are known to be solvents in some cases and valuable intermediates in other cases, for example for the production of plasticizers or plastics.

The invention is further illustrated by the following examples. The parts and percentages specified in the examples are parts and percentages by weight.

Example 1

150 parts of propionic acid and 150 parts of water are hydrogenated in an autoclave of alloy steel with 25 parts of catalyst at a hydrogen pressure of 300 atmospheres and 200° C. The catalyst consists of 91% of cobalt, 5% of manganese and 4% of polyphosphoric acid. Absorption of hydrogen ends after two hours. The reaction mixture is almost colorless and when distilled gives 114 parts of n-propanol having a boiling point of 97° C. at 760 mm. Hg and 6 parts of residue. The propanol is pure according to gas chromatography. The yield is 94.5% of the theory.

Example 2

150 parts of propionic acid is hydrogenated in the presence of 150 parts of crude anhydrous hydrogenation product according to Example 1, 150 parts of water and 25 parts of the catalyst used in Example 1 under the conditions specified in Example 1. 255 parts of n-propanol and 6.5 parts of residue are obtained. The yield is 96% of the theory.

Example 3

176 parts of butyric acid is hydrogenated in the presence of 148 parts of n-butanol and 28 parts of water using 20 parts of catalyst according to Example 1 under the conditions stated in Example 1. 291 parts (96.8% of the theory) of n-butanol and 2.4 parts of residue are obtained. The n-butanol is free from acid.

Example 4

200 parts of lauric acid is hydrogenated in the presence of 186 parts of lauryl alcohol and 40 parts of water using the catalyst described in Example 1 at 170° C. and a hydrogen pressure of 300 atmospheres. 358 parts of lauryl alcohol and 11 parts of residue are obtained by distillation. The yield is equivalent to 96.4% of the theory. The hydroxyl number of the alcohol is 301.

Example 5

141 parts of oleic acid is hydrogenated mixed with 134 parts of octadecyl alcohol and 12 parts of water using 25 parts of the catalyst according to Example 1. The temperature is 160° C. and the hydrogen pressure is 300 atmospheres. 260 parts of octadecyl alcohol (equivalent to 97% of the theory) and 4 parts of residue are obtained by distillation of the reaction mixture. The hydroxyl number of the product is 217.5 and the melting point is 57.8° C.

Example 6

174 parts of suberic acid is hydrogenated in the presence of 146 parts of octanediol-(1,8) and 15 parts of water at 200° C. and a hydrogen pressure of 300 atmospheres. 35 parts of catalyst is used which contains 71% of cobalt, 20% of copper, 5% of manganese and 4% of polyphosphoric acid. 272 parts of octanediol-(1,8) (equivalent to 94.5% of the theory) and 10.2 parts of residue are obtained. The hydroxyl number of the octanediol-(1,8) is 768.

Example 7

94 parts of azelaic acid in admixture with 160 parts of nonanediol-(1,9) and 30 parts of water is hydrogenated at 190° C. and 300 atmospheres. The catalyst (30 parts) contains 85% of cobalt, 6% of copper, 5% of manganese and 4% of polyphosphoric acid. Absorption of hydrogen is over after one hour. 218 parts of nonanediol-(1,9) (equivalent to 93.2% of the theory) and 9.8 parts of residue are obtained by distillation. The hydroxyl number of the reaction mixture is 696.

Example 8

101 parts of sebacic acid, together with 261 parts of recycled decanediol-(1,10) and 40 parts of water, is hydrogenated in contact with 50 parts of the catalyst described in Example 1. The temperature is 180° C. and the pressure of hydrogen is 300 atmospheres. 324 parts (equivalent to 95.1% of the theory) of snow-white crystalline decanediol-(1,10) having a hydroxyl number of 639 and 12 parts of residue are obtained.

Example 9

230 parts of dodecane diacid-(1,12) is hydrogenated in the presence of 202 parts of recycled dodecanediol-(1,12) and 60 parts of water in the way described in Example 6. 372 parts (equivalent to 93.6% of the theory) of colorless crystalline dodecanediol-(1,12) having a hydroxyl number of 552 and 19.1 parts of residue are obtained.

Example 10

122 parts of benzoic acid is hydrogenated in the presence of 108 parts of recycled benzyl alcohol and 50 parts of water under the conditions specified in Example 6. 187 parts (equivalent to 89% of the theory) of benzyl alcohol and 20 parts of residue are obtained.

Example 11

128 parts of hexahydrobenzoic acid is hydrogenated in the presence of 114 parts of recycled hexahydrobenzyl alcohol and 30 parts of water as described in Example 6. 199 parts (equivalent to 90.5% of the theory) of hexahydrobenzyl alcohol and 18.5 parts of residue are obtained. The hydroxyl number of the reaction product is 489.

Example 12

136 parts of phenylacetic acid is hydrogenated in the presence of 122 parts of β-phenylethyl alcohol (obtained by hydrogenation of phenylacetic acid) and 25 parts of water in the way described in Example 1. 202 parts (equivalent of 84% of the theory) of β-phenylethyl alcohol having a hydroxyl number of 458 and 17.1 parts of residue are obtained.

Example 13

138 parts of salicylic acid is hydrogenated in the presence of 124 parts of o-hydroxybenzyl alcohol and 25 parts of water under the conditions described in Example 6. A catalyst is used which consists of 70% of cobalt, 25% of copper, and 5% of manganese. 212 parts of o-hydroxybenzyl alcohol (equivalent to 89.5% of the theory) and 9.3 parts of residue are obtained. The hydroxyl number of the product is 898.

When a catalyst is used which also contains 1% of tertiary sodium phosphate, the yield of o-hydroxybenzyl alcohol is 93.4%.

Example 14

A carboxylic acid mixture (which has been freed from heavy metal ions, particularly from iron, by passage over an organic ion exchanger and which contains 50% of water, 1.1% of succinic acid, 3.5% of glutaric acid, 16.5% of adipic acid, 11.7% of ε-hydroxycaproic acid, 0.7% of butyric acid, 4.5% of valeric acid, 0.3% of caproic acid and, according to the ester number, 7.5% of ε-hydroxycaprolactone) is adjusted to a water content of 5% by distilling off part of the water. 300 parts per hour of this carboxylic acid mixture is passed together with hydrogen over 8400 parts of a catalyst which contains 91% of cobalt, 5% of manganese and 3% of phosphoric acid. The temperature is 170° C., the hydrogen pressure is 300 atmospheres, the average residence time is seven minutes. Such an amount of hydrogen is recycled that the temperature at the end of the catalyst zone is 210° C.

The crude, almost colorless, clear reaction mixture has an acid number of 1.5 and an ester number of 4.2. Water and the monoalcohols are distilled off first. The monoalcohols are separated from the water as the upper layer of the condensate. The residue is then fractionally distilled. From 300 parts of hydrogenation product per hour there are obtained 50.5 parts of water, 37.4 parts of monoalcohols, 3.9 parts of butanediol-(1,4), 14.4 parts of pentanediol-(1,5), 176 parts of hexanediol-(1,6) and 12 parts of residue.

The distilled diols are free from ester and acid. After twelve weeks the catalyst has an unchanged activity and has not been attacked chemically.

Example 15

The procedure of Example 14 is followed but the initial mixture is diluted with four times its weight of hydrogenation product from Example 14. The water content of the diluted initial mixture is 12%. 1200 parts per hour of the diluted mixture is passed over a catalyst which contains 71% of cobalt, 20% of copper, 5% of manganese and 4% of phosphoric acid. As soon as sufficient reaction mixture is present, the initial material is diluted with the crude monoalcohols whose water content has been adjusted to 7%. When steady-state conditions have been set up, the product is almost colorless and clear. The acid number is 0.7 and the ester number is 0.8. 1000 parts of the hydrogenation product yield, by distilling off water, the monoalcohols and distilling off the diols from the residue, 191 parts of water (containing 1.9% by weight of monoalcohols), 89 parts of monoalcohols, 678 parts of diols and 42 parts of residue. By careful distillation, the following are obtained from the diol mixture: 17 parts of butanediol-(1,4), 57 parts of pentanediol-(1,5) and 614 parts of hexanediol-(1,6). These products are free from acid and ester. The yield of diols is 95.8% of the theory.

The catalyst exhibits unchanged activity after twelve weeks. When activity subsides, the hydrogenation temperature is raised by 10° to 15° C. and the composition of the reaction mixture undergoes only an unimportant change. When the temperature is raised further, the proportion of monoalcohols increases slightly.

By using, under otherwise the same conditions, a catalyst which does not contain phosphoric acid, it is necessary to raise the temperature after ten weeks in order to maintain the activity of the catalyst. In other respects the conditions are the same as when using the catalyst containing phosphoric acid.

Example 16

The procedure of Example 15 is followed but 2% of trisodium phosphate is added to the catalyst containing phosphoric acid. The reaction temperature does not have to be raised until after fourteen weeks to keep the activity of the catalyst unchanged. The same result is achieved by adding 0.1% of trisodium phosphate to the initial mixture.

Example 17

The procedure of Example 15 is followed but a catalyst is used which contains 86% of cobalt, 5% of copper, 5% of manganese and 4% of phosphoric acid, and the water content of the supply is adjusted to 30%. The same yields are obtained, but the mixture of crude diols is free from acids and esters.

Example 18

1000 parts of the catalyst used in Example 15 is placed in a vertical high pressure apparatus and reduced with hydrogen at 300° C. 350 parts of a 30% solution of adipic acid in water which has been heated to 60° C. is passed per hour over the catalyst. The pressure of hydrogen is 300 atmospheres; the temperature rises along the catalyst layer from 170° to 195° C.

The reaction product is evaporated down to a water content of 15%. 590 parts of adipic acid is dissolved in the evaporated product. 500 parts per hour of this solution (containing 13% of water) is passed over the catalyst. The temperature rises from 180° to 210° C. along the catalyst layer. The hydrogen is recycled to remove heat.

The hydrogenation product contains 16% of water, 83% of hexanediol and 1.8% of residue. The yield of hexanediol, with reference to adipic acid supplied, is 96.8% of the theory. Hexanediol-(1,6) obtained by distilling the hydrogenation product has an acid number and ester number of 0 and a melting point of 41° C.

If a catalyst be used which contains 2% of molybdic acid or 2% of vanadium instead of phosphoric acid, the same result is obtained. When molybdic acid is added, the hydrogenation temperature is 20° C. lower than with the phosphoric acid catalyst but the life of the catalyst is somewhat shorter.

We claim:

1. A process for production of alcohols by catalytic hydrogenation of carboxylic acids at elevated temperature which comprises hydrogenating at 50–700 atmospheres pressure and at 120–300° C. a carboxylic acid selected from the group consisting of aliphatic carboxylic acids having 1–20 carbons and 1 to 3 carboxyl groups, aromatic carboxylic acids having 1 to 3 aromatic nuclei and 1 to 3 carboxyl groups, araliphatic carboxylic acids having 8 to 15 carbons and 1 to 2 carboxyl groups and cycloaliphatic carboxylic acids having 7 to 15 carbon atoms and 1 to 3 carboxyl groups in contact with a cobalt catalyst containing at least one member selected from the group consisting of copper, chromium and manganese at a weight ratio, as metals, of cobalt to said member of 1.5:1 to 300:1 and 0.1 to 15% by weight, based on the cobalt, of phosphoric acid.

References Cited

UNITED STATES PATENTS

| | | |
|---|---|---|
| 1,271,013 | 7/1918 | Bosch et al. |
| 2,110,483 | 3/1938 | Guyer. |
| 2,322,098 | 6/1943 | Schmidt. |
| 2,480,990 | 9/1949 | Whetstone. |
| 3,213,145 | 10/1965 | Field. |
| 3,344,196 | 9/1967 | Corr et al. |

FOREIGN PATENTS

| | | |
|---|---|---|
| 1,146,483 | 4/1963 | Germany. |

LEON ZITVER, Primary Examiner

J. E. EVANS, Assistant Examiner

U.S. Cl. X.R.

252—437; 260—575, 584, 618, 621, 635, 638